APPARATUS FOR CONTROLLED DEPOSITION OF MATERIAL

Filed Aug. 15, 1952 5 Sheets-Sheet 1

Inventor
John B. Kruft
By
Schroeder, Merriam, Hofgren & Brady
Attorneys

Jan. 29, 1957 J. B. KRUFT 2,779,059

APPARATUS FOR CONTROLLED DEPOSITION OF MATERIAL

Filed Aug. 15, 1952 5 Sheets-Sheet 2

Inventor
John B. Kruft
By
Schroeder, Merriam, Hofgren & Brady
Attorneys

APPARATUS FOR CONTROLLED DEPOSITION OF MATERIAL

Filed Aug. 15, 1952 5 Sheets-Sheet 3

Inventor
John B. Kruft
By Schroeder, Merriam, Hofgren & Brady
Attorneys

APPARATUS FOR CONTROLLED DEPOSITION OF MATERIAL

Filed Aug. 15, 1952 5 Sheets-Sheet 4

Inventor
John B. Kruft
By Schroeder, Merriam, Hofgren & Brady
Attorneys

APPARATUS FOR CONTROLLED DEPOSITION OF MATERIAL

Filed Aug. 15, 1952 5 Sheets-Sheet 5

Inventor
John B. Kruft
By Schroeder, Merriam, Hofgren & Brady
Attorneys

United States Patent Office 2,779,059

Patented Jan. 29, 1957

2,779,059

APPARATUS FOR CONTROLLED DEPOSITION OF MATERIAL

John B. Kruft, Skokie, Ill., assignor to Kruft Corporation, a corporation of Delaware Application August 15, 1952, Serial No. 304,598

6 Claims. (Cl. 18—30)

This invention relates to an improved apparatus for the controlled deposition of material and more particularly to an apparatus adapted for automatic deposition of a predetermined precise quantity of material on a work piece element to form printed electrical circuit components.

This application is a continuation-in-part of my co-pending application entitled "Apparatus and Method for Controlled Deposition of Material," Serial Number 230,605, filed June 8, 1951, now Patent No. 2,697,253.

A number of difficult problems arise in attempting to deposit substantially identical amounts of molding material on each of a number of work piece elements. These problems are particularly apparent in the field of printing electrical circuits. For example, in printing a resistance element it is imperative that each element have identically the same dimensions and volume of material since the electrical value of the resistance element is very sensitive to even a small variation in the volume or configuration of the material deposited. In many applications in which printed circuits are used, the values of the circuit elements are quite critical and variations of more than a few percent cannot be tolerated.

One object of this invention is to provide an apparatus which will deposit a precisely predetermined amount of material on a work piece surface. Another object is to provide an apparatus which will perform this operation automatically. A further object is to provide such an apparatus that is adapted to deposit material automatically on each of a plurality of work piece elements. A further object is to provide such an apparatus which includes feed means, a matrix element with a cavity therein that is adapted for sealed engagement with a work piece element, after which the cavity is filled with material and then the matrix and work piece are separated in such a manner that any material remaining in the feed means is retained there. And a further object is to provide such an apparatus which includes means for venting the cavity to permit complete filling thereof, the vent means being adapted to retain any of the material passing thereinto. Yet another object is to provide such an apparatus in which the feed and vent means includes, respectively, an inlet and an outlet duct associated with the cavity, the size and shape of the ducts, with relation to the material used, being such that they in cooperation with the rest of the feed and vent means have an action analogous to that of a pipette to cause retention of the material therein on separation of the matrix and the work piece. Yet a further object is to provide such an apparatus in which at least one of the contacting surfaces of either the matrix element or the work piece has sufficient resilience to effect a seal, and sufficient rigidity to prevent any effective change in the cavity size. And yet another object is to provide valve means in connection with the feed and vent means which are so constructed that the material passing therethrough is not allowed to enter areas of metal-on-metal contact.

Further objects and advantages will become apparent from the description and from the drawings, in which.

Figure 1:
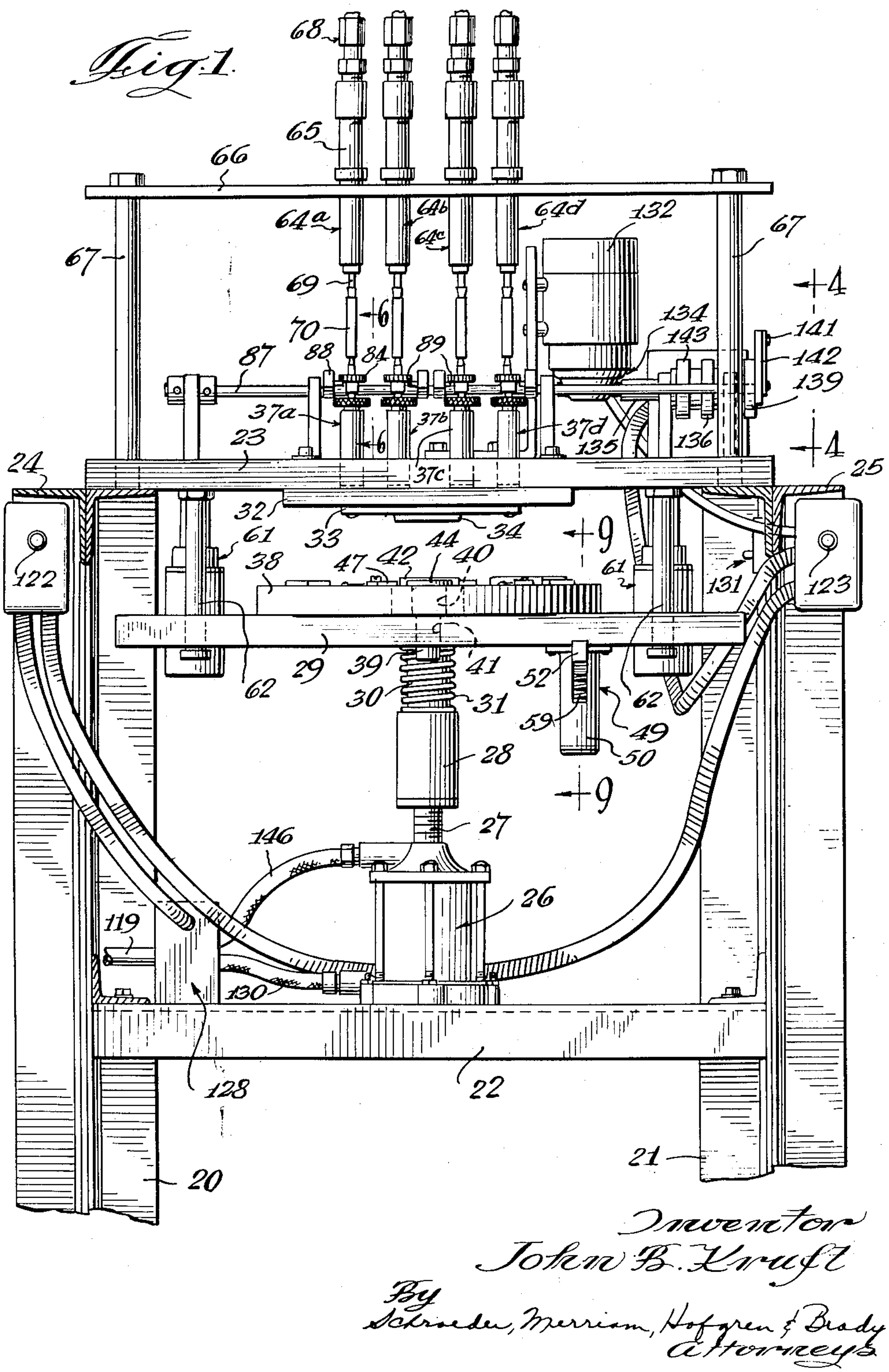
Figure 1 is a front elevational view of an apparatus illustrative of one embodiment of my invention.
Figures 2, 4:
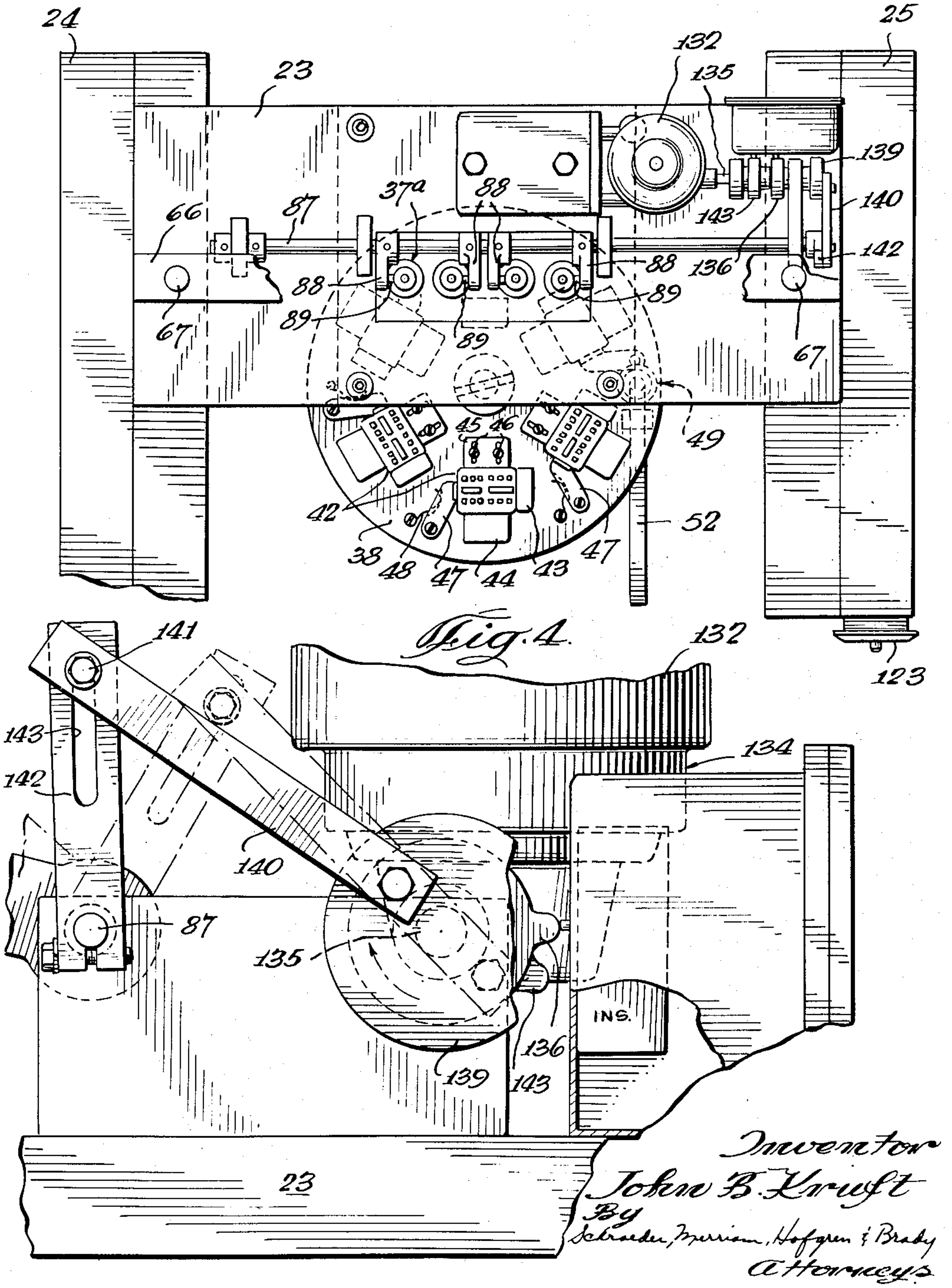
Figure 2 is a top plan view, with some portions broken away, of the apparatus of Figure 1.
Figure 4 is a fragmentary view of the valve control mechanism taken as shown by the line 4—4 of Figure 1.

The operation of my invention can be best understood from Figures 1 and 2, and I will present a general description of this operation before describing the various elements thereof.

In the particular embodiment of my invention illustrated herewith the framework of the press includes two upright legs 20 and 21, and a horizontal brace 22. An upper press plate 23 is carried by the horizontal frame members 24 and 25. A pneumatic ram 26 is mounted on the horizontal brace 22 and has a movable piston rod 27 which carries a hollow cylindrical sleeve 28 threaded thereto. The lower press plate 29 is resiliently mounted on the piston rod 27 by means of a rod 30 affixed to the bottom thereof and extending into the cylindrical sleeve 28 and a coil spring 31 which surrounds the rod 30 and engages the bottom of the lower press plate 29 and the top of the cylindrical sleeve 28. The purpose of this structure will become apparent later.

Affixed to the bottom of the upper press plate 23 are a valve plate 32 and a matrix block 33. A matrix element 34 having a shallow cavity 35 therein is carried in a recess 36 of the matrix block (see Fig. 3). A plurality of valves 37*a–d* which are associated with the feed and vent means, are affixed to the valve plate 32. The details of the construction and operation of these valves and the feed and vent means will become apparent later.

A rotatable work locating table 38 is carried on top of the lower press plate 29. A pin 39 passes through holes 40 and 41 in the work table and the lower press plate respectively, and provides an axis for the rotation of the work table. The work piece elements 42 are carried on top of the locating table and are properly positioned there by jig means comprising two fixed plates 43 and 44, the plate 45 which may be adjusted to the size of the work piece element being used by loosening the screws 46, and the pivoted arm 47 which holds the work piece in place by virtue of the bias applied by the leaf spring 48. The locating table as shown is adapted to carry six work piece elements. It is obvious of course that the physical dimensions could be altered to provide apparatus adapted to handle any desired number of work pieces.

Figure 9:
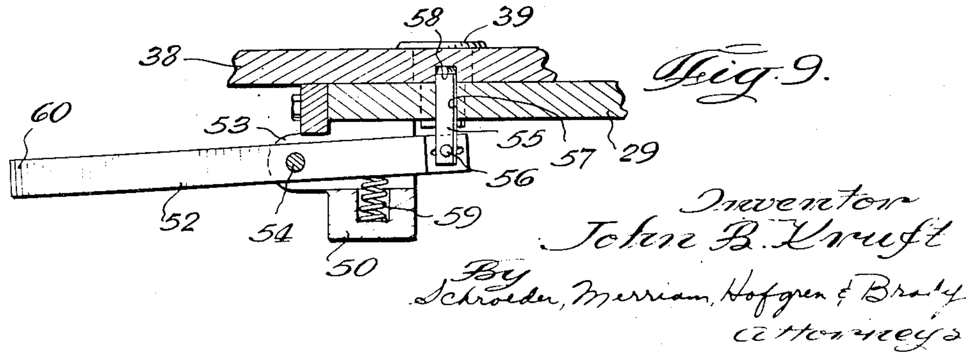
Figure 9 is a fragmentary sectional view of the work table locating mechanism, taken as shown by the line 9—9 in Figure 1.

Table positioning means indicated generally as 49 are provided to lock the table in position with a work piece element in register with the matrix block 33 (see Fig. 9). A cylindrical housing 50 is attached to the lower press plate 29, and has an operating lever 52 pivotally attached to the ear 53 by means of the pin 54. At one end of the operating lever 52 a locating rod 55 is pivotally attached by the pin 56. The locating rod extends upwardly through an opening 57 in the lower press plate 29, and is adapted to enter one of a plurality of positioning holes 58 in the undersurface of the work locating table 38. The coil spring 59 normally biases the locating rod upwardly to lock the table in place. The free end 60 of the operating lever 52 may be moved upwardly to disengage the locating rod from the positioning hole to allow rotation of the table.

The rotatable locating table 38 is intended to be illustrative of means which are adapted to successively position each of a plurality of work piece elements in register with the matrix block. It is obvious that those means could take many forms as, for example, a continuously moving conveyor belt or a single unit jig with a magazine feed.

When a work piece element is properly in register with the matrix block 33, the apparatus is ready for a cycle of operation. The pneumatic ram 26 is operated to drive the lower press plate 29 and the work table 38 upwardly to effect a seal between the surface of the matrix element 34 and a work piece 42. The details of the control apparatus which initiate this operation will be described later. Aligning bearings 61 are provided to insure that the upper and lower press plates 23 and 29 will remain substantially parallel at all times. The resilient support for the lower press plate 29 (piston rod 27, sleeve 28 and spring 31) may be adjusted by screwing the sleeve 28 up or down on the piston rod 27. By virtue of this arrangement the pressure between the work piece surface and the matrix element may be predetermined and controlled precisely.

After the matrix and work element surfaces have been sealed together the feed and vent valves 37 are opened automatically to allow the cavity 35 to be filled with material. After the cavity has been filled the valves are closed automatically and the pneumatic ram 26 is reversed to move the lower press plate 29 downwardly so as to break the seal between the matrix element and the work piece. All material in the inflow and outflow means at this time is retained in order that only the material which filled the cavity will be deposited on the work piece. The flanged stop rods 62 prevent excessive downward movement of the lower press plate. The locating table 38 may now be rotated, as previously described, to bring another work piece element into register with the matrix block.

As shown in Figure 1 four identical material handling assemblies 64*a*–*d* are provided. Each of these assemblies may form a part of either the feed or vent means depending upon the particular circuit configuration being printed and the layout of the feed and vent channels in the matrix block 33 as will be described later. Each of the assemblies includes reservoirs 65 which are supported by the cross member 66 and the rods 67. These reservoirs are hollow cylinders which are adapted to hold the material being used. Pressure or vacuum lines (not shown) may be attached to the feed and vent reservoirs respectively by means of the fittings 68. Each of the reservoirs is provided with a fitting 69 at the bottom thereof, to which is attached a length of tubing 70. These tubes are preferably of a flexible transparent material in order that the presence or absence of the printing material therein may be noted. The lower ends of the tubes communicate with the valves 37*a*–*d*.

Figures 3, 5, 6:
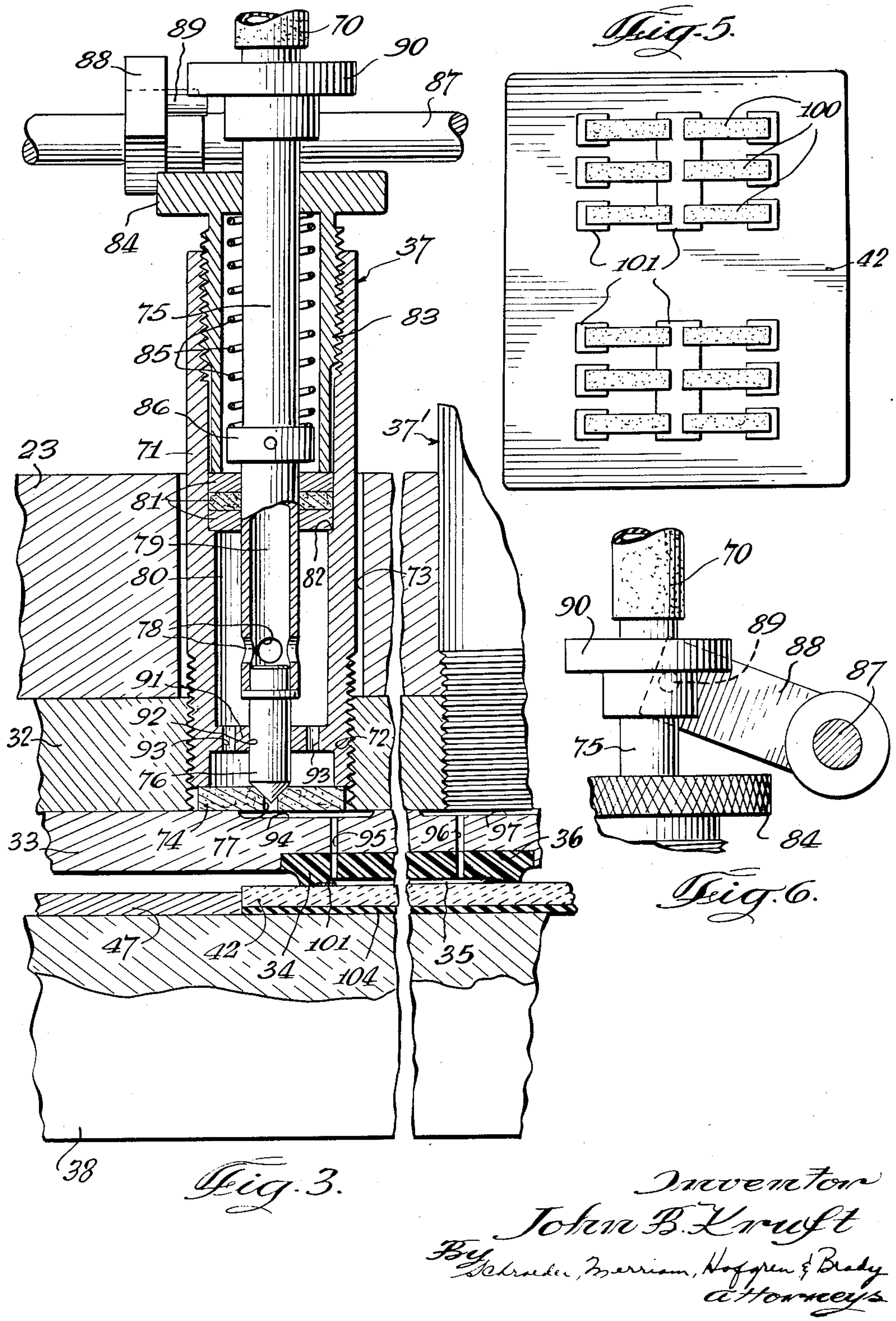
Figure 3 is a fragmentary vertical section showing some of the details of construction.
Figure 5 is a plan view of a work piece element having a printed electrical circuit thereon, illustrative of the type of work produced by my invention.
Figure 6 is taken as shown by the line 6—6 of Figure 1, and shows the details of the valve operating arm.

Turning now to Fig. 3, the structure of one of the valves 37 will be examined in more detail. The valve comprises a hollow cylindrical valve housing 71 which is threaded into an opening 72 in the valve plate 32 and extends upwardly through an opening 73 in the upper press plate. A washer 74 is provided adjacent the matrix block 33 against which the valve housing is seated. This washer is preferably made of leather to prevent contamination of the material used and should be slightly smaller in diameter than the opening 72.

A hollow cylindrical valve tube 75 is spaced from and passes longitudinally through the valve housing. The upper end of the valve tube communicates with the hose 70, as shown in Fig. 1. At the lower end of the valve tube 75 is a conical pointed push-off plunger 76 which is adapted to seat in an aperture 77 through the washer 74. A plurality of apertures 78 communicate between the interior 79 of the valve tube 75 and the interior 80 of the valve housing 71 to permit the passage of material therebetween.

A plurality of packing members 81 provide a seal between the valve housing and the valve tube. These packing members are seated on a shoulder 82 in the inner surface of the valve housing and are held in place by a packing gland 83, which may have a knurled portion 84 to facilitate tightening thereof. A coil spring 85 encircles the valve tube within the packing gland and bears against both the gland and a collar 86 fastened to the valve tube to force it downwardly and to seat the plunger 76 in the aperture 77 of the washer 74. This is the normal closed position of the valve.

The automatic valve operating means will be described fully later, but the results of their operation will be pointed out here. On the initiation of a cycle, the shaft 87 is rotated a small distance clockwise as viewed in Fig. 6 causing the valve operating arm 88 and the pin 89 to move upwardly into contact with the collar 90, thereupon lifting the valve tube and plunger and opening the valve. At the conclusion of a cycle, the shaft 87 turns back counterclockwise and allows the spring 85 to force the valve tube and plunger downwardly closing the valve.

A web 91 may be provided in the valve housing 71 with an opening 92 therethrough to guide the valve plunger 76. The holes 93 allow the material to pass through the web.

Those portions of the valve which will come in contact with the material used are preferably made of stainless steel in order to prevent contamination of the material. Furthermore, the material is excluded from the major areas of metal-on-metal contact by the packing members 81.

Assuming for the purposes of illustration that the cutaway valve shown in Fig. 3 is a feed valve, material will be fed under pressure from the reservoir through the hose into the valve tube 75 and will pass through the apertures 78 and fill the interior 80 of the valve housing. When the valve is opened the material will pass through the aperture 77 in the washer 74 and into an inflow channel 94 in the matrix block 33 and thence through the inflow duct 95 into the matrix cavity 35. At the same time the cavity is being vented through an outflow duct 96, an outflow channel 97 and a vent valve 37′ which is identical in construction to the feed valve 37 but which is connected to a source of vacuum rather than to a reservoir of material and a source of pressure.

Figure 7:
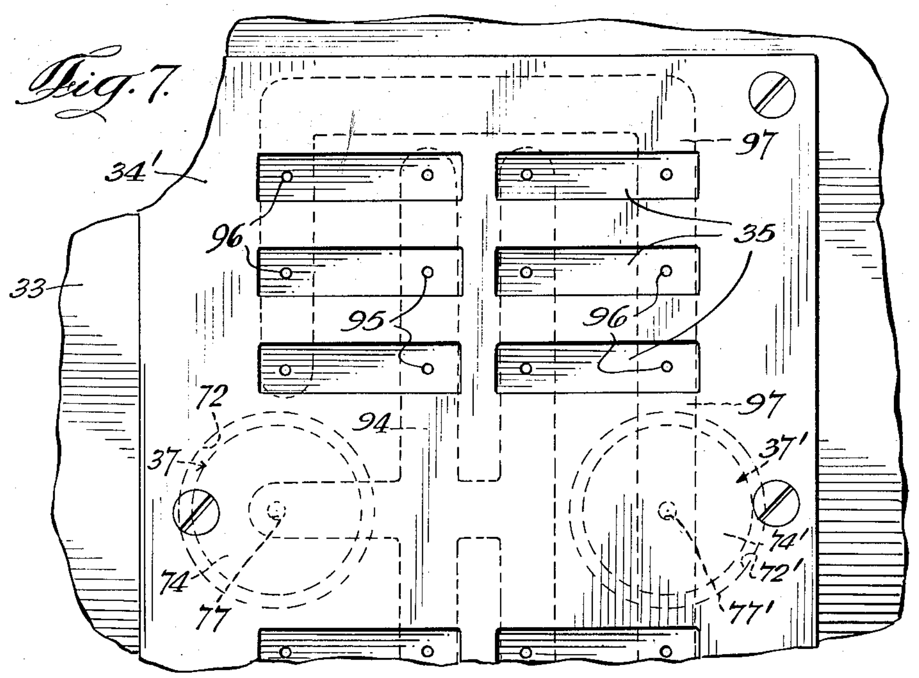
Figure 7 is a fragmentary bottom view of a matrix element.
Figure 8:
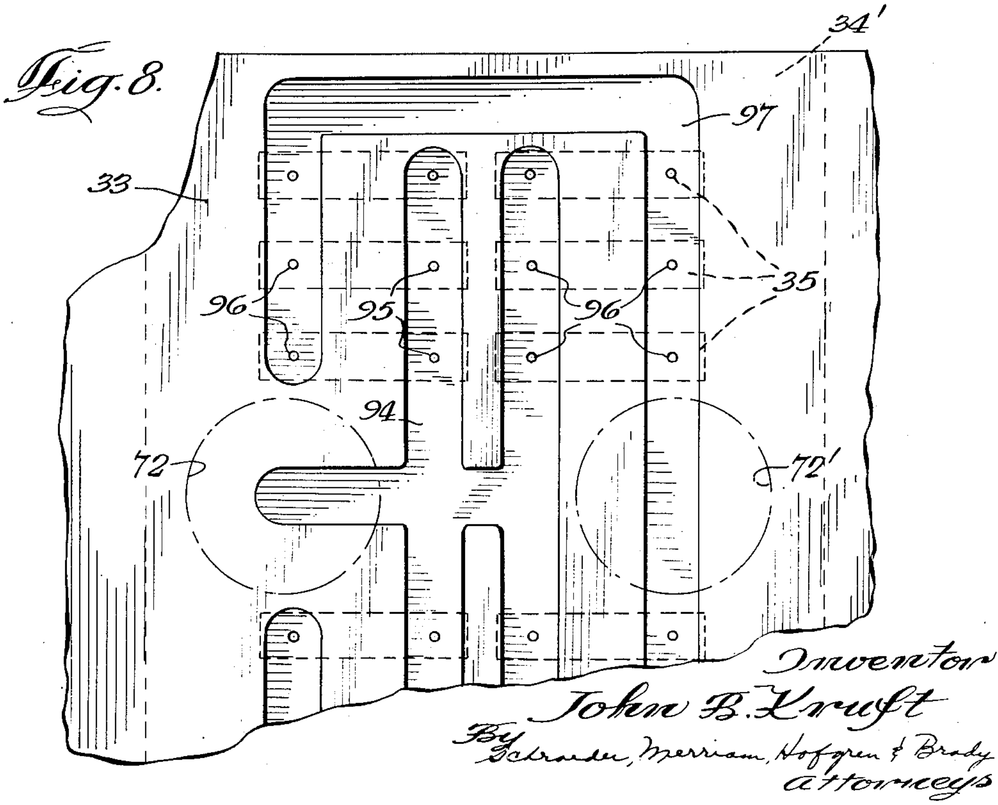
Figure 8 is a fragmentary top view of a matrix block.

The arrangement of the cavities, ducts and channels shown in Figs. 7 and 8 is not intended to conform physically with that shown in Fig. 3, but is indicative of one possible configuration which might be utilized. The same reference numerals will be used to indicate analogous structural features in Figs. 3, 7 and 8.

Referring now to Figures 7 and 8, the inflow channel 94 is recessed in the top surface of the matrix block 33 and communicates with the aperture 77 in the washer 74 under the feed valve 37*a*. An inflow duct 95 leads to each of the cavities 35 in the matrix element 34′ and passes through the matrix element and the matrix block to communicate with the inflow channel. Similarly, outflow ducts 96 lead from each cavity through the matrix block and the matrix element to the outflow channel 97 which in turn communicates with a vent valve assembly indicated generally as 37*b*, and which is similar in structure to the feed valve already discussed. The layout of the inflow and outflow channels 94 and 97 is of course determined by the particular circuit configuration being printed.

The particular embodiment shown in Figures 7 and 8 is designed to print the circuit shown in Fig. 5, which has twelve resisters 100 and the terminal portions 101. These terminal portions may be of a conducting material such as finely divided silver, and are applied to the work piece element 42 before the resistance material is deposited thereon.

It is necessary that a perfect seal be formed between the surface of the matrix element 34 and the surface of the work piece element 42, despite the fact that there are irregularities inherent in the surface of the work piece element and that the silver conducting or terminal portions 101 have been applied thereto and form a step of possibly one or two thousandths of an inch. In order that the perfect seal necessary may be attained I have found it desirable to use for the matrix element 34 a material which may be described as reluctantly or slightly yieldable. This material must have sufficient resilience to form a seal with the surface of the work piece element 42.

It must be remembered however that notwithstanding the fact that a certain amount of resilience is desirable, the matrix element must have sufficient rigidity to prevent any effective change in the volume of the cavity 35. Furthermore, the material used must not be affected either physically or chemically by the molding material. I have found that polyethylene having a molecular weight of at least 6,000 is satisfactory and other materials such as styrene resins, vinyl resins and butyl synthetic rubbers having comparable resiliency are satisfactory.

It is extremely difficult to obtain work piece elements in which the upper and lower surfaces are exactly parallel. It is desirable that they should be so in order that the seal between the matrix element surface and the work piece will be properly made. I have provided a resilient pad 104, which may be of rubber, between the workpiece element 42 and the locating table 38 in order at least partially to remedy this situation.

As was mentioned earlier it is imperative that any material in either the feed or the vent means be retained there by the separation of the matrix element and the work piece. If this is not done the quantity of material deposited cannot be accurately controlled. In order to accomplish this the inflow and outflow ducts 95 and 96 are so shaped or restricted with respect to the material being deposited, that they in cooperation with the rest of the feed and vent means are adapted to retain any material therein on separation of the matrix element and the work piece. This action may be considered analogous to that of an ordinary pipette.

In one embodiment of the apparatus which is being used, the diameter of the ducts is 0.040 inch, and the material used has a viscosity reading of twenty-one seconds on a No. 4 Ford cup viscosimeter. The specific duct diameter which is suitable will of course vary a bit depending on the viscosity of the material.

Figure 10:
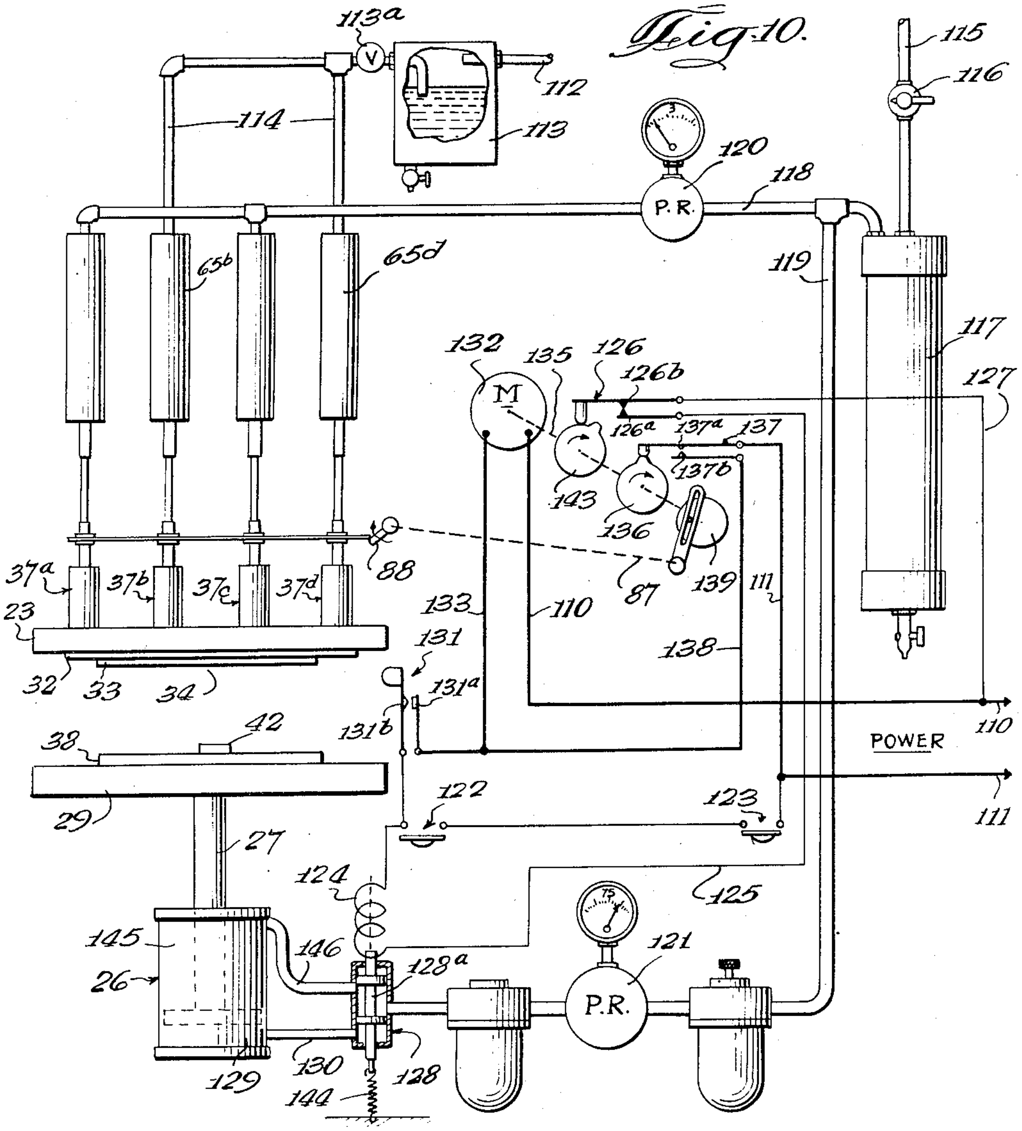
Figure 10 is a diagrammatic sketch showing the various controls and their operation.

Turning now to Figure 10, I will describe the control apparatus that provides the automatic operation of my invention.

The wires 110 and 111 are connected to a source of electrical power (not shown) for example, 110 volts A. C., to provide energy for the various electrical elements in the control system. The pipe 112 is connected to a source of vacuum (not shown), and through a trap 113, valve **113*a* and pipes 114 to the vent reservoirs 65*b* and 65*d*. The pipe 115 is connected to a source of pressure (not shown) and through a valve 116, a bleeder 117 and the pipes 118 and 119 to the feed and locating the drive means respectively. Pressure reducing valve 120 controls the pressure to the feed means and is preferably set for 3 pounds, while valve 121 maintains the pressure to the pneumatic ram 26** at 75 pounds.

As shown in Fig. 10, the apparatus is ready to begin a cycle of operation, which is initiated by simultaneously closing the start switches 122 and 123. This completes a circuit from one side of the line, 111, through the switches, the solenoid coil 124, wire 125, contacts **126*a* and 126*b* of the table release switch 126 and the wire 127 to the other side of the line 110. This energizes the solenoid coil 124 which draws the piston, 128*a*, of the ram control valve 128, upwardly as shown in the diagram and connects the source of pressure to the lower chamber 129 of the pneumatic ram 26 through the pipe 130. This causes the piston rod 27 and the work locating table 38** to move upwardly, bringing the surface of a work piece element into intimate sealed contact with the surface of the matrix element as has been previously described.

When the locating table has reached its uppermost position, it causes the motor-start switch 131 to close, starting the motor 132. This circuit is completed from line 110 through the motor 132, the wire 133, switch contacts **131*a* and 131*b*, the starting switches 122 and 123 back to the other side of the line 111. As the motor 132 is energized its armature shaft, through a reduction gearing 134 (Fig. 1), causes the drive shaft 135 to turn in a clockwise direction as diagrammatically shown in Fig. 10. As soon as this shaft has turned a few degrees, the rotation of the cam wheel 136 mounted thereon allows the normally opened contacts 137*a* and 137*b* of the motor holding switch 137 to close completing a circuit from one side of the line 111 through the switch, wire 138 and the motor 132 to the other side of the line 110. The operator may then release the start switches 122 and 123**.

A valve drive wheel 139 is attached to the drive shaft 135 and carries an eccentrically mounted arm 140. Attached to the other end of the arm 140 (by means of the bolt 141) is a lever arm 142. The other end of the lever arm 142 is rigidly attached to the shaft 87. As the drive shaft 135 is rotated in a clockwise direction by the motor 132, the eccentric arm 140 and the lever arm 142 cause the shaft 87 to be rotated a few degrees in a clockwise direction to a position indicated by the dotted lines in Fig. 4. As has been previously described, the shaft 87 has the valve operating arms 88 attached thereto and this clockwise motion causes the valves **37*a–d*** to be opened.

By varying the position of the bolt 141 in the slot 143 of the lever arm 142, the period of time during which the valves are opened can be varied to a certain extent.

It is preferable, as illustrated diagrammatically in Fig. 10, to have both the feed and vent valves operate simultaneously. This may be adjusted individually to a slight degree, however, by varying the relative position of the valve operating arms 88 on the shaft 87.

Continued rotation of the valve drive wheel 139 returns the valves to their closed position, after a predetermined period of time sufficient for the cavities 35 to be filled with material. After the valves have been closed, the drive shaft 135 will continue to turn until table release switch 126 is opened by the cam wheel 143. When the contacts **126*a* and 126*b* are separated, the solenoid coil 124 is deenergized allowing the spring 144 to draw the ram control valve piston 128*a* to its lowermost position. This connects the upper chamber 145 of the ram 26 to the source of pressure through the pipe 146, causing the work locating table 38 to be moved downward and breaking the seal between the work piece element 42 and the matrix element 32. The motor 132 continues to run until the cam wheel 136 opens the contacts of the motor holding switch 137**. The apparatus is now ready for another cycle of operation.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for depositing material on a work piece element, comprising: a matrix element having a surface with a cavity therein; a locating table carrying the work piece element; means for causing relative movement of said matrix and said locating table toward and away from each other, said means being adapted to bring a surface of the work piece element and said matrix surface into intimate sealed contact; means for feeding material to the matrix cavity; means for venting the matrix cavity; and means for operating said feed and vent means to deliver automatically a predetermined quantity of material to the cavity when a work piece and the matrix element are in intimate sealed contact, said feed and vent means being adapted to retain any of the material therein upon separation of the matrix and the work piece.

2. Apparatus of the character described for depositing material on a work piece element, comprising: a matrix element having a surface with a cavity therein; a locating table carrying the work piece element; means for causing relative movement of said matrix and said locating table toward and away from each other, said means being adapted to bring a surface of the work piece element and said matrix surface into intimate sealed contact; means for feeding material to the matrix cavity, said means including an inflow duct leading into the cavity and a feed valve; means for venting said cavity to permit complete filling thereof, said means including an outflow duct and a vent valve; and means for opening said feed and vent valves automatically when the work piece element surface and the matrix surface are in intimate sealed contact and for closing said valves automatically when at least a predetermined quantity of material has been delivered to said cavity, said inflow and outflow ducts, at least where they join the cavity, being so restricted with respect to the material used that they in cooperation with the rest of said feed and vent means are adapted to retain any material therein upon separation of the matrix and the work piece.

3. Apparatus of the character described for depositing material on a work piece element, comprising: a matrix element having a surface with a cavity therein; a locating table carrying the work piece element; drive means for causing relative movement of said matrix and said locating table toward and away form each other, said drive means being adapted to bring a surface of the work piece element and said matrix surface into intimate sealed contact; means, including a feed valve, for feeding material to the matrix cavity; means, including a vent valve, for venting the matrix cavity; and control means for opening said feed and vent valves automatically when the work piece element surface and the matrix surface are in intimate sealed contact for closing said valves automatically when at least a predetermined quantity of said material has been delivered to said cavity, and for causing said drive means to separate the work piece element surface and the matrix surface after said valves are closed, said feed and vent means being adapted to retain any of the material therein upon separation of the matrix and the work piece.

4. Apparatus of the character described for depositing material on each of a plurality of work piece elements, comprising: a matrix element having a surface with a cavity therein; a locating table carrying the work piece elements, said table being adapted to position each of said work piece elements successively in register with said matrix element; means for causing relative movement of said matrix element and said locating table toward and away from each other, said means being adapted to bring a surface of one of said work piece elements and said matrix surface into intimate sealed contact; means for feeding material to the matrix cavity; means for venting the matrix cavity; and means for operating said feed and vent means to deliver automatically a predetermined quantity of material to the cavity when a work piece and the matrix element are in intimate sealed contact, said feed and vent means being adapted to retain any of the material therein upon separation of the matrix element and the work piece.

5. Apparatus of the character described for depositing a precise quantity of material on each of a plurality of work piece elements, to form an electrical circuit component thereon, comprising: a matrix block element having a surface with a cavity therein; a movable locating table carrying the work piece elements; positioning means operably associated with said locating table and adapted to lock the table in position with a work piece element in register with said matrix block element; drive means for causing relative movement of said matrix block element and said locating table toward and away from each other, said means being adapted to bring a surface of the work piece element and said matrix surface into intimate sealed contact; means for feeding material to the matrix cavity, said means including an inflow duct leading into the matrix cavity and a feed valve; means for venting said cavity to permit complete filling thereof, said means including an outflow duct and a vent valve; means, initiated by movement of the work piece and matrix block element into contact, for opening said feed and vent valves and for closing said valves automatically when at least a predetermined quantity of the material has been delivered to the cavity, and for causing said drive means to separate the work piece element surface and matrix surface after said valves are closed, said inflow and outflow ducts being so restricted relative to the material that they in cooperation with the rest of the feed and vent means are adapted to retain any material therein on separation of the surfaces.

6. In an apparatus of the character described for depositing material on a work piece element: a matrix element having a surface with a cavity therein, adapted for intimate sealed contact with a surface of the work piece element; material feed means for introducing material to the cavity while said surfaces are sealed, said means including a feed valve; an inflow duct operatively associated with said material feed means and leading into said cavity, said inflow duct being so shaped, at least where it enters said cavity, that it in cooperation with said feed means acts as a pipette to retain any of the material therein on separation of the surfaces; vent means for venting said cavity to permit complete filling thereof, said means including a vent valve; a vent duct operatively associated with said vent means and leading from said cavity, said vent duct being so shaped, at least where it enters said cavity, that it in cooperation with said vent means acts as a pipette to retain any of the material therein on separation of the surfaces.

References Cited in the file of this patent

UNITED STATES PATENTS

| | | |
|---|---|---|
| 791,648 | Richards | June 6, 1905 |
| 912,092 | Droitcour | Feb. 9, 1909 |
| 1,973,117 | Sklar | Sept. 11, 1934 |
| 2,321,000 | Bennett | June 8, 1943 |
| 2,357,950 | Goessling | Sept. 12, 1944 |
| 2,358,040 | Williams | Sept. 12, 1944 |
| 2,431,843 | Swoger | Dec. 2, 1947 |
| 2,465,799 | Gravesen | Mar. 29, 1949 |
| 2,573,123 | Weiss | Oct. 30, 1951 |
| 2,697,253 | Kruft | Dec. 21, 1954 |